Jan. 11, 1966  A. R. DE BEAUSACQ  3,228,239
APPARATUS FOR MEASURING THE STRESSES APPLICABLE TO SKIER'S SHOES
Filed Oct. 17, 1962  6 Sheets-Sheet 1
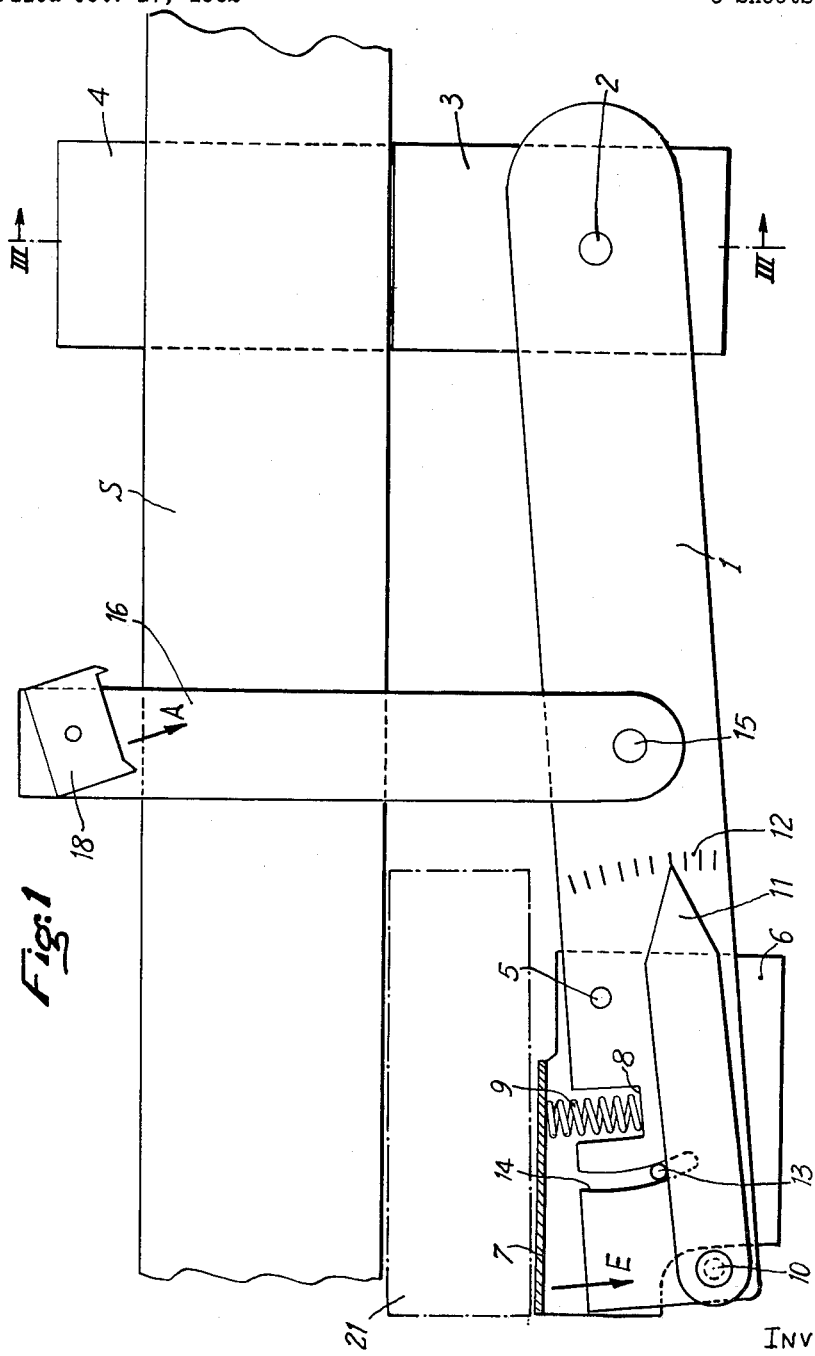
INVENTOR
ALFRED RAYMOND DE BEAUSACQ
BY Irvin S. Thompson
ATTORNEY

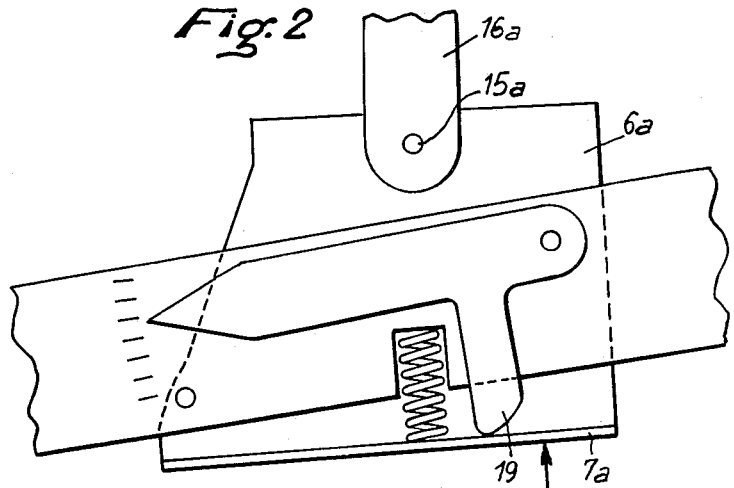
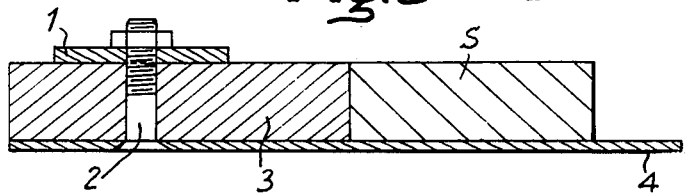
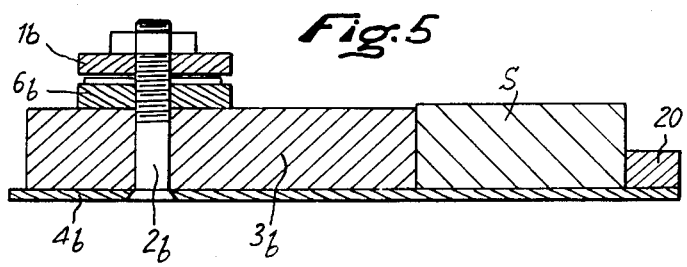
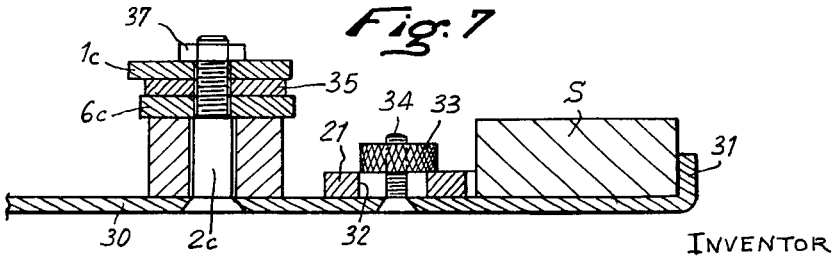

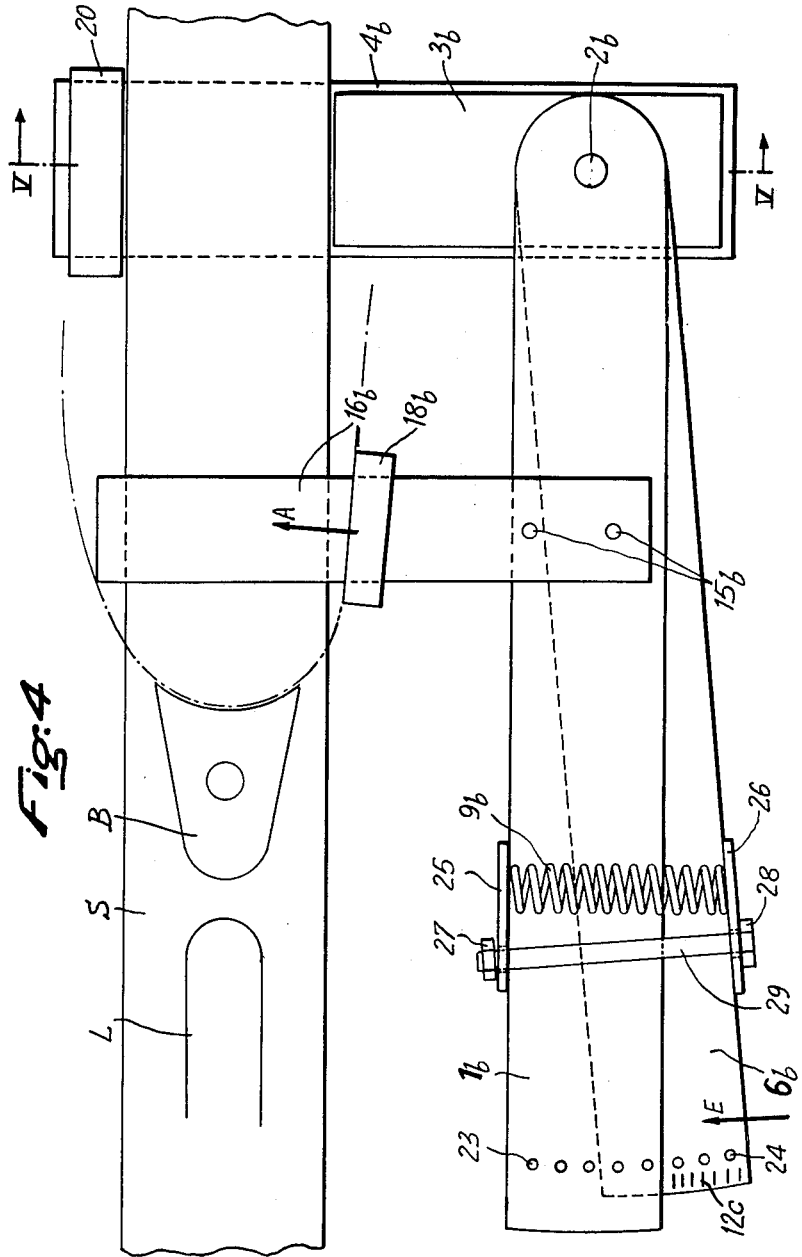

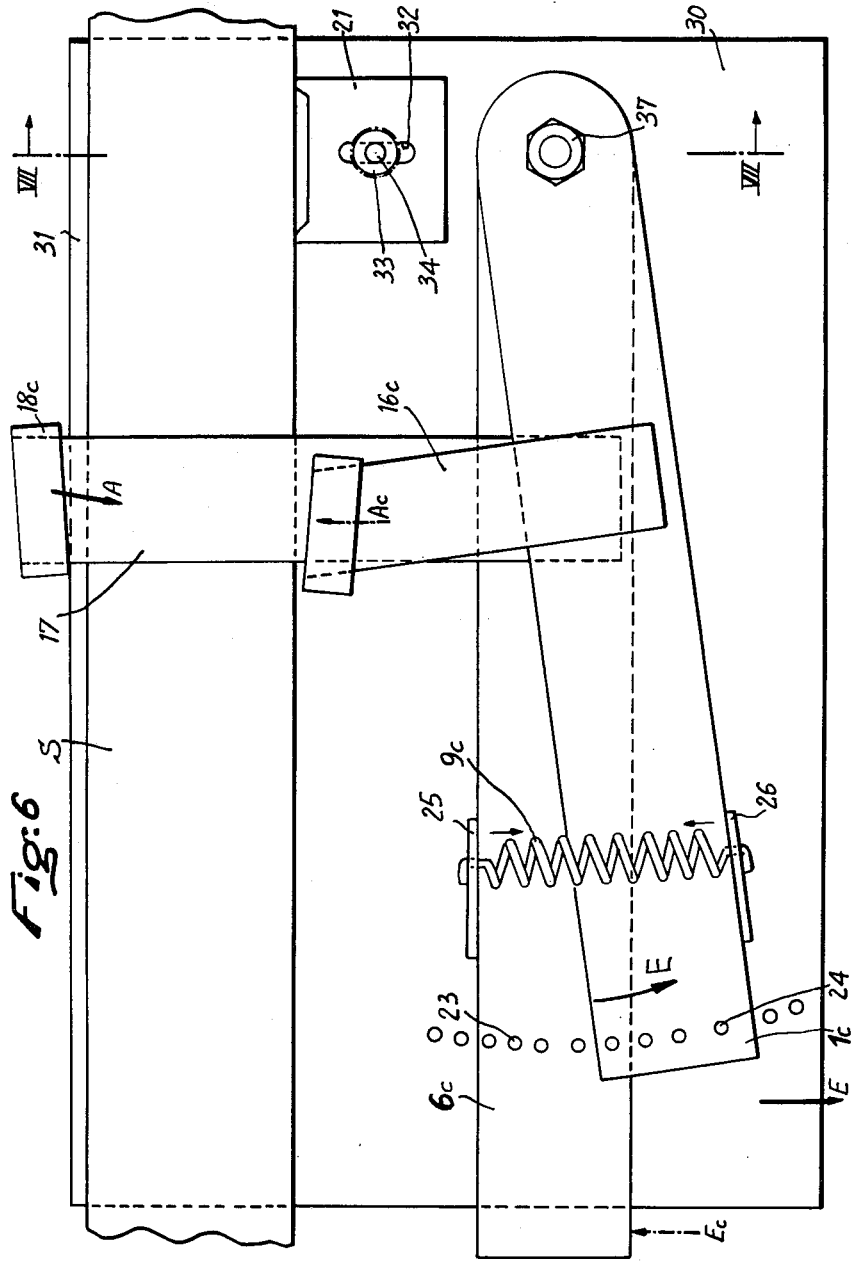

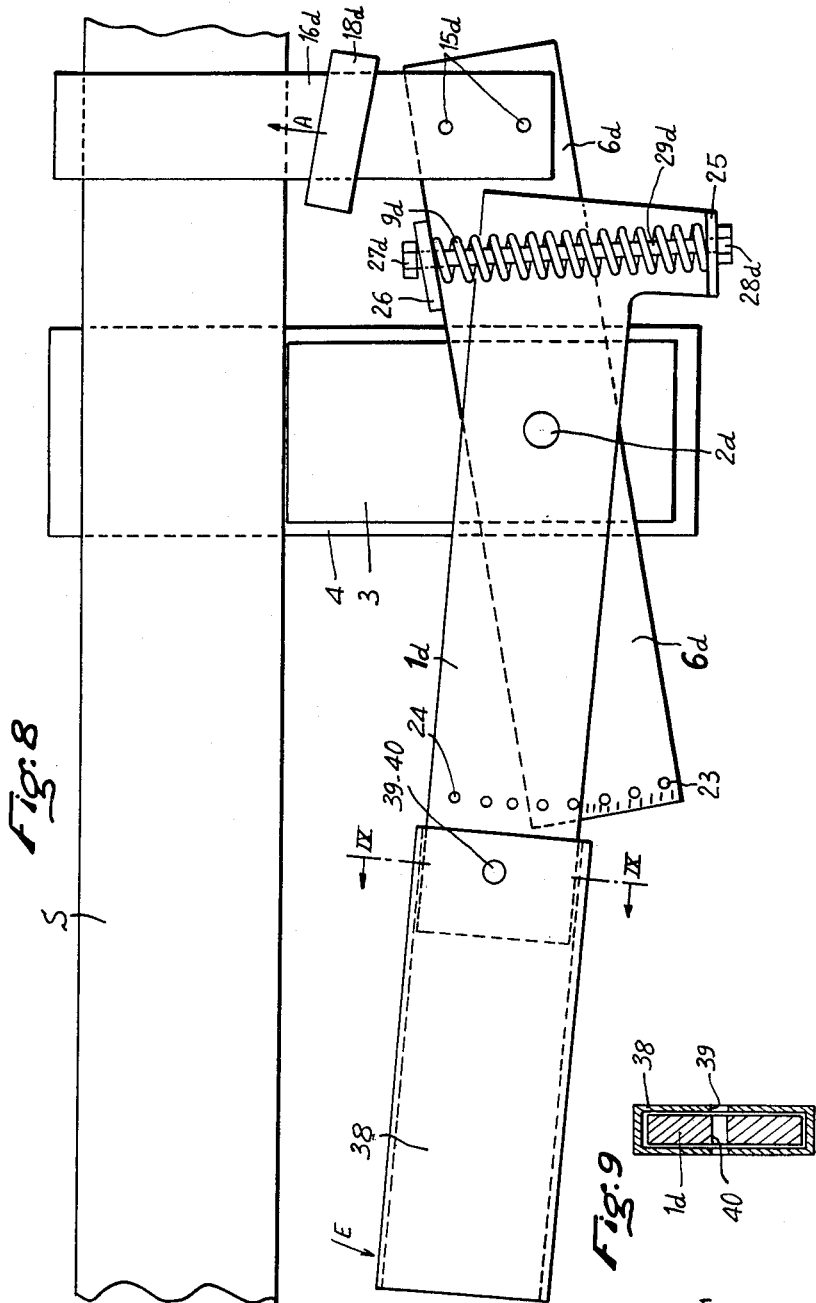

Jan. 11, 1966 A. R. DE BEAUSACQ 3,228,239
APPARATUS FOR MEASURING THE STRESSES APPLICABLE TO SKIER'S SHOES
Filed Oct. 17, 1962 6 Sheets-Sheet 6
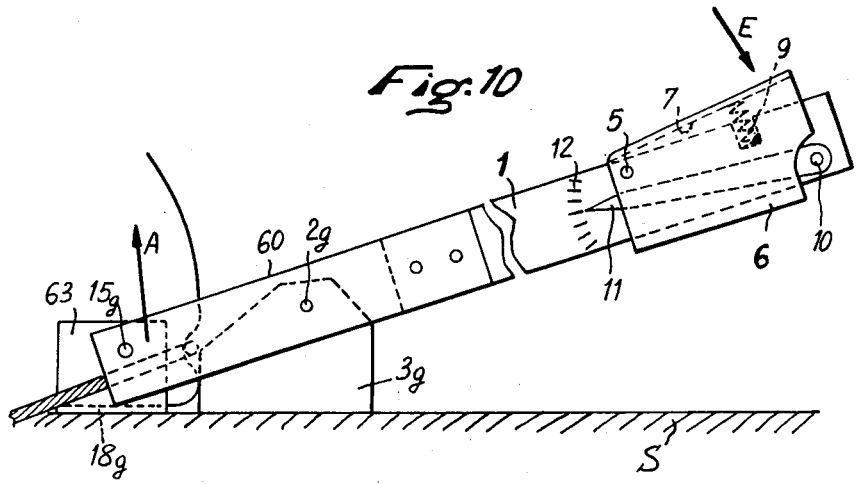
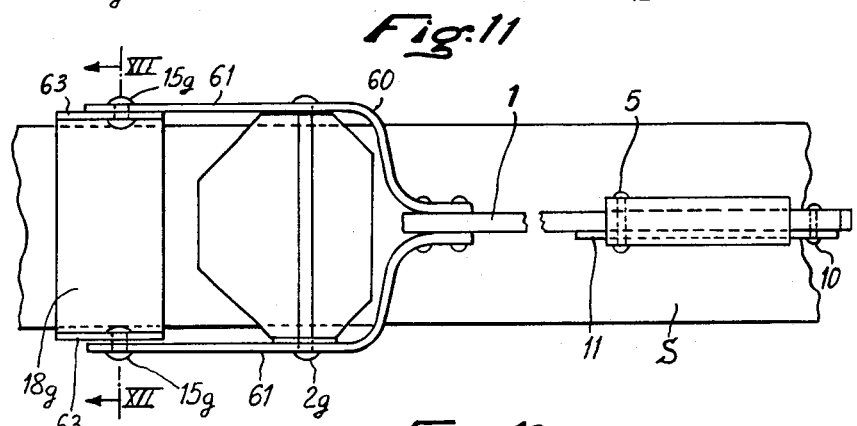
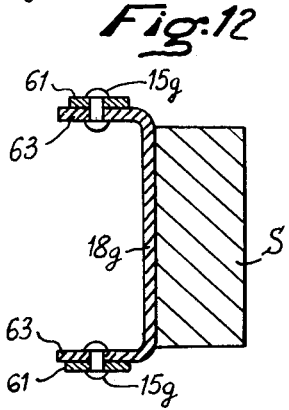
INVENTOR
ALFRED RAYMOND DE BEAUSACQ
BY Irwin S. Thompson
ATTORNEY United States Patent Office 3,228,239
Patented Jan. 11, 1966

3,228,239
APPARATUS FOR MEASURING THE STRESSES
APPLICABLE TO SKIER'S SHOES
Alfred Raymond de Beausacq, 4 Rue Gustave Courbet,
Paris, France
Filed Oct. 17, 1962, Ser. No. 231,235
Claims priority, application France, Oct. 17, 1961,
876,218
5 Claims. (Cl. 73—133)

My invention has for its object a novel apparatus adapted to measure the stress to be exerted with a view to releasing a skier's shoe secured to a ski by a conventional safety system.

Said apparatus which is intended to aid the person adjusting the safety system, is constituted by a wrench incorporating novel means for its simultaneous application to a ski and to the shoe on the latter.

It is a well-known fact that, chiefly in the case of the adjustment of pivotal safety stops controlled by the shifting of the front of the skier's shoe, various factors oppose said shifting, to wit: the tensioning of the cable, the spacing between the point of contact between the front of the shoe and the stop, friction between the sole and the ski and, consequently, it is essential for the adjustment to take into account all of these factors simultaneously.

My improved apparatus offers the considerable advantage consisting in that the adjustment may be performed on the shoe worn by the skier, which allows taking into account the skier's weight and also the total resistance opposing the lateral shifting of the front of the foot. Although I am a specialist of such problems of safety for skiers, I am not aware that any means have been as yet proposed for measuring the force which is to be applied to a skier's shoe in order to release a safety system.

In other fields, there exist, of course, various means for measuring weights, for gauging springs, and chiefly for tightening nuts, but none of these means is applicable to the case considered by applicant. For instance, in the case of a dynamometric wrench, the end of the dynamometer is fitted over the head of the nut, which forms the center of rotation. Now, for a shoe, the pivotal center lies at a distance from the point of application of the stresses required for urging forwardly the end of a shoe sole. If the latter were replaced by a dummy sole, it would be possible to hold fast the dynamometer end, but it would be necessary to resort to a dummy sole identical with the sole of the shoe of the actual skier, failing which the conditions would be quite different from those required.

Furthermore, it should be reminded that it is highly advantageous to measure the stresses on the shoe actually worn by the skier. This cannot be performed for measuring the resistance against forward falling and the operator has to find a substitute for the stress exerted by the skier's heel.

My improved apparatus includes a first elongated element, a pivot adapted to be held fast and carrying rockably said first element at a point remote from the point of application of the stress to be exerted on said first element, a second elongated element pivotally secured to the first element, elastic means connecting the two elongated elements and opposing energetically any modification of the original angular position of said elements, a control arm provided at one end with a bearing member adapted to engage one of the edges of the shoe, while its other end is secured to one of the two elongated elements at a point the distance of which from the pivot is smaller than the distance between said pivot and the point of application of the stress, a scale allowing the reading of the angular spacing of said elongated elements with reference to their initial angular position and possibly means adapted to transiently hold fast the two elements in their relative angular position which has been selected so as to correspond to the stress producing a release of the skier's shoe.

My invention has thus for its object to replace and to measure the stress exerted on the safety means when the skier falls forwardly or laterally with a twisting effect. Consequently, the force exerted by the operator on applicant's apparatus allows measuring a lateral effort exerted by the skier's shoe or else the effort provided by the raising of the skier's heel.

I have illustrated in the accompanying diagrammatic drawings a preferred embodiment of my invention. In said drawings:

FIG. 1 illustrates diagrammatically in plan view a first embodiment of my invention.

FIG. 2 is a fragmentary view from above of a second embodiment.

FIG. 3 is a cross-section through line III—III of FIG. 1.

FIGS. 4 and 5 are plan and sectional views of a third embodiment, FIG. 5 being a cross-section along line V—V of FIG. 4.

FIGS. 6 and 7 are similar plan and sectional views of a fourth embodiment providing both for tractional and compressional action, FIG. 7 being a cross-section through line VII—VII of FIG. 6.

FIGS. 8 and 9 are similar plan and cross-sectional views of a fifth embodiment, FIG. 9 being a cross-section through line IX—IX of FIG. 8.

FIGS. 10 to 12 are a side view, a view from above and a sectional view through line XII—XII of FIG. 10 of a last modification.

In all the plan views, the front of the ski has been illustrated as directed towards the left-hand side of the drawings. The tensioning lever L and the pivotal stop B of the shoe-securing means are illustrated in a purely diagrammatic manner and the sole of the skier's shoe is illustrated only in FIG. 4 wherein they are drawn in dot-and-dash lines.

In the embodiment illustrated in FIGS. 1 to 3, the first elongated element 1 forming a lever is pivotally secured at 2 to the upper surface of a block 3 the thickness of which is substantially equal to the thickness of a ski and said block engages the ski underneath which the small plate 4 secured to the underside of the block 3 extends. Near the other end of the first element 1 forming a lever, there is secured at 5 a second elongated element 6 forming a handle and constituted by a U-shaped metal sheet, of which the two sides extend respectively above and underneath the lever 1. Said lever or elongated element 1 is cut out so as to form a recess housing a spring 9 held between the bottom 8 of the recess and the back or web 7 of the U-shaped element 6. Said back has been illustrated as sectionalized so as to allow the lower side of said element to appear to view. A pointer 11 is pivotally secured at 10 to the lever 1, for instance by means of a shouldered rivet so as to revolve with slight friction over the lever; the tip of said pointer moves in front of the scale 12 carried by the lever 1. A rivet 13 secured to both sides of the U-shaped handle 6 is adapted to move inside an arcuate notch 14 formed in the lever or element 1. A control arm 16 is carried at a point 15 of the lever 1 which latter point subdivides in a simple ratio the distance separating the housing 8 of the spring from the pivot 2; to the end of the arm 16 is pivotally secured a contact block 18 of which the teeth are intended to engage the sole of the skier's shoe.

To execute a measurement, the skier positions the arm 16 (FIG. 1) over the ski behind the pivotal stop of the safety means; he sets his shoe over said arm and secures it to the ski in the usual manner. He sets his entire weight on this single ski and raises slightly his heel while an assistant urges then the block 3 against one side of the ski and exerts on the second handle-forming element 6 a stress in the direction of the arrow E. This produces on the control arm 16 and consequently on the shoe sole an action in the direction of the arrow A which compresses the spring 9 while the rivet 13 constrains the pointer 11 to move. At the accurate moment at which the front of the skier's shoe and consequently the pivotal stop begin pivoting, the lever moves away from the handle under the action of the expansion of the spring 9 but the pointer 11 remains in registry with the subdivision of the scale corresponding to the maximum stress which has been reached. The system including the spring 9, the housing 8, the back 7 of the member 6 and the pointer 11 forms thus a recording dynamometer.

A second embodiment is illustrated cross-sectionally in FIG. 3. The second elongated member is almost identical with that illustrated in FIG. 1 but its position is reversed. The second elongated element 6a in the form of a U caps the lever 1 as precedingly, but at a location adjacent that of the arm 16 of FIG. 1. The arm 16a in this case is secured at 15 to one of the sides of the second elongated element 6a. The part played by the rivet 13 is played, in the present case, by a projection 19 rigid with the pointer 11a and engaging the back of the elongated element 6.

The measurement is executed as precedingly with the sole difference consisting in that the stress exerted in the direction of the arrow E is no longer performed on the second elongated element, but on the end of the first elongated element opposed to the pivot of the block 3. Care should be taken to position one's hand at a suitable location whereas, in the first embodiment, the speed-reducing ratio does not depend on this location and is, on the contrary, defined by the ratio between the distance separating the pivot 2 from the recess 8 and the distance separating the said pivot 2 from the point of attachment 15 of the control arm.

It is possible to adjust, even the first time the apparatus is used the pivotal stop acting on the pointer, to make it correspond to a predetermined scale subdivision of the dynamometer system. In the case of FIG. 1, the spring 9 is compressed until the pointer shows the desired subdivision, after which, while his hand is held fast on the second handle-forming element, the operator shifts rearwardly into the gap between the handle element and the ski, a wedge or the like locking member 35 showing on the side facing the edge of the ski projections adapted to bite into said ski. When the operator's hand releases the handle, the latter continues, in such a case, compressing the spring and urging the first elongated element away so that the relative angular position between the two elongated elements may be retained. The pointer 11 remains thus in registry with the selected scale subdivision. The adjusting screw is then released gradually with reference to the stop or abutment of any type used as a safety device, so as to reduce its resistance against pivotal movement and, as soon as the release of the screw is sufficient to reduce efficiently said resistance, the skier's shoe sole pivots together with the stop. The desired adjustment of the stop has thus been obtained in a perfectly accurate manner.

In the arrangement illustrated in FIGS. 4 and 5, the stress and the reaction of the shoe sole described with reference to FIGS. 1 to 3 as a tractional stress and reaction, are replaced by thrusts and it is therefore necessary to apply a small bar 20 which is secured to the plate 4 over the edge of the ski facing away from the lever 1 (FIG. 6) so as to hold the ski in position.

include each at their ends a series of openings 23–24 and carry laterally each a square-shaped lug, the end of which is turned upwardly at 90°, as shown at 25–26. These lugs form abutments for the ends of the elastic means 9b urging the two elongated elements angularly apart. Said angular spacing is limited by the nuts screwed over a rod 29 passing in a very free manner through said lugs. The arm 16b, provided with its contact block 18b, is secured to one of the elongated elements 1b and 6b.

The thrust exerted on the other elongated element, as illustrated by the arrow E, compresses the elastic means 9 which transmit to the shoe through the block 18b and the arm 16b a thrust in the direction of the arrow A.

The measurement is then read on the scale 12b on the element 6b.

Means are provided to transiently hold fast the elongated elements in the angular spacing assumed by them and are constituted by a pin fitted through an opening 24 selected in the corresponding element 1a into a bench or the like stationary part such as the plate 30 of FIG. 6.

FIG. 6 illustrates a modification of the preceding arrangement to which is incorporated a second arm 17 adapted to transmit the tractional stress and which is longer than the first arm 16c and passes underneath the latter. Said tractional arm 17 is secured to the second elongated elements 6c and it carries a further contact block 18c. The front section of the shoe sole, which is not illustrated, is set between the two blocks.

Thus, the same apparatus may serve for executing in alternation a measurement on each of the edges of the shoe sole.

With this apparatus, it is possible to resort to tractional springs the ends of which are secured to the two lugs 25 and 26 so as to urge said elongated elements towards each other. The second elongated elements 6c is positioned at a level underneath the first element and the longer arm 17c is secured thereto and extends underneath the arm 16c secured to the first elongated element.

It is possible to use said arm 16c with the block and with the small bar 20 of FIG. 4, but according to a modification, said arm has been illustrated as secured to a flat support or carrier plate 30 having an edge 31 forming a stop and provided with a series of openings corresponding to 23–24. A small bar 21, provided with a gate 32, is locked, after adjustment, to match the breadth of the ski, by means of a knurled nut 33 which is screwed over the screw 34 (FIG. 7) passing through the gate 32. The shouldered pivot 2c is welded to the flat support and a thick washer 35 and its smooth section carries in succession one elongated element, a washer 35 and the other elongated element, the assembly being held in position by a nut 37.

The stress exerted tractionally on the first elongated element 1c in the direction of the arrow Ec increases the length of the spring so as to urge the second elongated element 6c towards the first element while the arm 17 produces through the agency of the block 18c a tractional stress on the sole of the skier's shoe as illustrated by the arrow Ac.

In contradistinction, if the second element 6c which is longer than the first element 1c is urged in the direction of the arrow Ec, the first element will then move nearer the second element and its arm 16c extending above the arm 17c urges the shoe sole into movement.

The arrangement thus described may serve as well with a compression spring which requires retaining the rod 29 illustrated in FIG. 4. By superposing the elongated elements in a reverse relative position, the element 1c will lie underneath the element 6c and said element 1c will carry the longer arm 17c.

The tractional action exerted on the handle 6c will compress the spring and transmit therefore a tractional 6c is drawn out in the direction of the arrow E; the block 18 carried by the arm 17c engages the shoe sole while the block carried by the arm 16c moves away from it. Lastly, the spring is compressed, and the angle between the two elongated elements is reduced, the shoe sole being subjected, through the agency of the arm 17c and of its block, to a tractional stress.

In all the preceding figures, the different parts are positioned on the same side of the pivot whereas in the apparatus illustrated in FIG. 8, the same parts are retained, but the stress exerted on one of the elongated elements transmits its movement through the spring to the shoe sole, to produce through the other element, an action which is antagonistic with said stress. For transportation, it is possible to shorten the elements by resorting to a sheath 38 sliding over one or both elements. Before using the apparatus, a pin which is not illustrated, is inserted in the openings 39 of the sheath 40 sliding over the corresponding element, as illustrated in FIG. 9.

A tractional spring may obviously be used in this latter modification as also in the arrangement of FIG. 6. It is apparent that a floor such as the floor 30 (FIG. 6) can be used in the embodiments according to FIGS. 4 and 8.

The skier may provide himself for the desired adjustment by operating the handles, the shoe being fitted on the skier's foot and secured in position.

Many skis include, in addition to the safety means operating in case of undesired twisting movements, a safety device which releases the skier's foot when the latter falls, the skier's heel rising then which leads in its turn to an increase in the tensioning of the associated cable above a value corresponding to the adjustment provided for said safety device. It is therefore necessary to measure the vertical force which the heel is to exert so as to make said device operate, said force ranging between 100 and 170 kg.

The apparatus illustrated in FIGS. 12 to 14 associates certain parts of FIG. 1 and of FIG. 8. The operator adjusting the apparatus exerts a stress on parts which are identical with those illustrated in FIG. 1, to wit the end of the element 1, the axis 5 of the second element 6, the spring 9 engaging the bottom of the recess 8, the back 7 of the element 6 and the pointer 11 cooperating with the scale 12.

As in the case of FIG. 8, the pivot 2g is positioned between the point of application of the operative force and the point of engagement of the arm on the shoe sole. The block 3g engages the upper surface of the ski instead of engaging one of its sides. The element 1 extends as a fork 60 made of a thick metal sheet, adapted to pivot round a pivot 2g extending in parallelism with the surface of the ski through the block 3g. To the two sides 61 of the forked extension 60 of the element 1 are secured through rivets 62 the sides 63 of the stirrup-shaped member forming the arm of the apparatus and transmitting the stresses; the bottom 18g of the stirrup-shaped member forms the block adapted to engage the underside of the skier's heel.

What I claim is:

1. An apparatus adapted to simultaneously form a substitute for and measure the stress exerted by a portion of a skier's foot for overcoming the release setting of one of the safety devices on a ski against torsional forces and falling of the skier in an axial direction, said apparatus comprising two elongated elements pivotally connected and adapted to move angularly with reference to each other and a point of one of which is adapted to be subjected to an actuating stress, a pivot carrying said one element at a point remote from the point of application of the stress to be exerted on it and adapted to be held fast with reference to the ski, elastic means interconnecting the two elongated elements and opposing any modification of the original angular spacing thereof, a control arm secured to one of the elongated elements at a distance from the pivotal connection between the elements which is smaller than the distance between said pivotal connections and the point of application of the stress, a bearing member rigid with an end of the control arm and adapted to engage a portion of a skier's shoe secured to the ski and reading means adapted to give out the angular spacing between said elements.

2. An apparatus adapted to simultaneously form a substitute for and measure the stress exerted by a portion of a skier's foot for overcoming the release setting of one of the safety devices on a ski against torsional forces and falling of the skier in an axial direction, said apparatus comprising two elongated elements, a point of one of which is adapted to be subjected to an actuating stress, a pivot carrying both said elements at a point remote from the point of application of the stress to be exerted on it and adapted to be held fast with reference to the ski, elastic means interconnecting the two elongated elements and opposing any modification of the original angular spacing thereof, a control arm secured to the other elongated element at a distance from the pivot between the elements which is smaller than the distance between said pivot and the point of application of the stress, a bearing member rigid with an end of the control arm and adapted to engage a portion of a skier's shoe secured to the ski and reading means adapted to give out the angular spacing between said elements.

3. In an apparatus as claimed in claim 1, the provision of means adapted to hold fast the two elements against the action of the elastic means in the angular position corresponding to a predetermined stress adapted to produce the release of the skier's shoe.

4. In an apparatus as claimed in claim 1, the provision of a wedge adapted to hold fast the two elements against the action of the elastic means in a predetermined angular position corresponding to the stress producing the release of the skier's shoe.

5. In an apparatus as claimed in claim 1, the provision of a carrier plate to which the elements are pivotally connected, means adapted to transiently secure the element subjected to the actuating stress and the plate to hold fast the two elements against the action of the elastic means in the angular position corresponding to a predetermined stress adapted to produce the release of the skier's shoe, and means through which the carrier plate is rigidly secured to the ski.

No references cited.

RICHARD C. QUEISSER, *Primary Examiner.*
ROBERT L. EVANS, *Examiner.*